(12) United States Patent
Schwartz et al.

(10) Patent No.: US 6,405,188 B1
(45) Date of Patent: *Jun. 11, 2002

(54) INFORMATION RETRIEVAL SYSTEM (75) Inventors: Richard M. Schwartz, Sudbury; David R. H. Miller; Timothy R. Leek, both of Cambridge, all of MA (US)

(73) Assignees: Genuity Inc., Burlington, MA (US); GTE Service Corporation, Irving, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,685

(22) Filed: Jul. 31, 1998

(51) Int. Cl.[7] .............................................. G06F 17/30
(52) U.S. Cl. ..................... 707/3; 707/4; 707/5; 707/6; 707/104
(58) Field of Search ........................... 707/1, 3, 5, 103, 707/4, 6, 104; 704/256; 706/45

(56) References Cited

U.S. PATENT DOCUMENTS

| 5,488,725 A | * | 1/1996 | Turtle et al. ................ 707/5 |
| 5,594,897 A | * | 1/1997 | Goffman ................... 707/103 |
| 5,696,964 A | * | 12/1997 | Cox et al. .................. 707/5 |
| 5,822,731 A | * | 10/1998 | Schultz ..................... 704/256 |
| 5,905,980 A | * | 5/1999 | Masuichi et al. ........... 707/1 |
| 5,930,803 A | * | 7/1999 | Becker et al. .............. 707/104 |
| 5,950,189 A | * | 9/1999 | Cohen et al. ............... 707/3 |
| 6,192,360 B1 | * | 2/2001 | Dumais et al. ............. 707/6 |
| 6,301,571 B1 | * | 10/2001 | Tatsuoka ................... 706/45 |

OTHER PUBLICATIONS

Jiang et al., Sequential Bayesian Learning of CDHMM based on Finite Mixture Approximation of Its Prior/Posterior Density, 1997, IEEE, pp. 373–380.*

Pullen et al., "A New Approach to GPS Integrity Monitoring Using Prior Probability Models and Optimal Threshold Search", 1994, IEEE, pp. 739–746.*

* cited by examiner

*Primary Examiner*—Dov Popovici
*Assistant Examiner*—Thuy Pardo
(74) *Attorney, Agent, or Firm*—Leonard Charles Suchyta; James K. Weixal (57) ABSTRACT

Methods and systems for providing an improved IR system that performs information retrieval by using probabilities. When performing information retrieval, the improved IR system utilizes both the prior probability that a document is relevant independent of the query as well as the probability that the query was generated by a particular document given that the particular document is relevant. By using these probabilities, the improved IR system retrieves documents in a more accurate manner than conventional systems which are based on an ad hoc approach.

7 Claims, 8 Drawing Sheets

INFORMATION RETRIEVAL SYSTEM

FIELD OF THE INVENTION

The present invention relates generally to data processing systems and, more particularly, to an improved information retrieval system.

BACKGROUND OF THE INVENTION

Information retrieval (IR) systems have been developed that allow users to identify particular documents of interest from among a larger number of documents. IR systems are useful for finding an article in la digital library, a news story in a broadcast repository, or a particular web site on the worldwide web. To use such systems, the user specifies a query containing several words or phrases specifying areas of interest, and the system then retrieves documents it determines may satisfy the query.

Conventional IR systems use an ad hoc approach for performing information retrieval. Ad hoc approaches match queries to documents by identifying documents that contain the same words as those in the query. In one conventional IR system, an ad hoc weight is assigned to each matching word, the weight being computed from an ad hoc function of the number of times the word occurs in the document divided by the logarithm of the number of different documents in which the word appears. This ad hoc function was derived through an empirical process of attempting retrievals using the system and then modifying the weight computation to improve performance. Because conventional information retrieval systems use an ad hoc approach, accuracy suffers.

SUMMARY OF THE INVENTION

Methods and systems consistent with the present invention provide an improved IR system that performs information retrieval by using probabilities. When performing information retrieval, the improved IR system utilizes both the prior probability that a document is relevant independent of the query as well as the probability that the query was generated by (would be used to retrieve) a particular document given that the particular document is relevant. By using these probabilities, the improved IR system retrieves documents in a more accurate manner than conventional systems which are based on an ad hoc approach.

In accordance with methods consistent with the present invention, a method in a data processing system having information items is provided. This method receives a query containing a query word from a user, determines a likelihood that at least one of the information items is relevant given the query word, and provides an indication that the at least one information item is likely relevant to the query word.

In accordance with systems consistent with the present invention, a data processing system is provided containing a secondary storage device with documents, a memory with a query engine, and a processor configured to run the query engine. The query engine is configured to receive a query with query words indicating a relevant one of the documents and configured to utilize a formula to determine which among the documents is the relevant document. The formula is based on a model for how the query words were generated to express a need for the relevant document.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved IR system that uses probabilities to improve accuracy over conventional systems. Specifically, the improved IR system receives a query, determines the likelihood that each of a number of documents is relevant given the query, and returns a list of the documents determined to be most relevant. Methods and systems consistent with the present invention do not use an ad hoc approach like conventional systems; rather, they use an approach having a sound mathematical basis. As a result, the improved IR system typically achieves a greater accuracy than conventional, ad hoc IR systems.

Methods and systems consistent with the present invention approach the problem of relating queries to documents as a statistical pattern recognition problem, finding all documents that are relevant to the query. In doing so, the improved IR system derives the posterior probability that each document is relevant given the query and then chooses all documents whose posterior probability (i.e., P(document is relevant|query)) is above a certain threshold or ranks them according to this probability. By reformulating the posterior probability using Bayes' rule, the following formula is derived:

$$P(D \text{ is } R | Q) = \frac{P(D \text{ is } R) * P(Q | D \text{ is } R)}{P(Q)}$$

Where the term "P(D is R)" refers to the prior probability that a document is relevant (independent of the query, which reflects that a given document may be more likely to be relevant than others. For example, based upon empirical data obtained from many retrievals, it can be determined that documents from a particular source tend to be more relevant than others. Also, the length of a document is directly related to the likelihood that it is relevant (i.e., the more words a document has, the more likely that it will contain information in which the user is interested). As an alternative to the prior probability, a bias (i.e., any positive value) could be used by methods and systems consistent With the present invention to optimize the accuracy of the improved IR system.

The term "P(Q|D is R)" reflects a generative model of the probability that the query was generated by a particular document given the document is relevant. The generative model models the process of the user creating a query by using a hidden Markov model (discussed in further detail below), and based on this model, the improved IR system derives various probablistic formulae, which are used during the information retrieval process.

The last term "P(Q)" reflects the likelihood of receiving a query independent of any of the documents. Because this probability is common to all documents, this term can be removed and the formula can be reformulated as follows:

$$P(D \text{ is } R|Q) \alpha P(D \text{ is } R) * P(Q|D \text{ is } R)$$

Accordingly, the improved IR system retrieves documents based on an estimation of the likelihood that the document is relevant given the query.

Overview

Figure 1A:
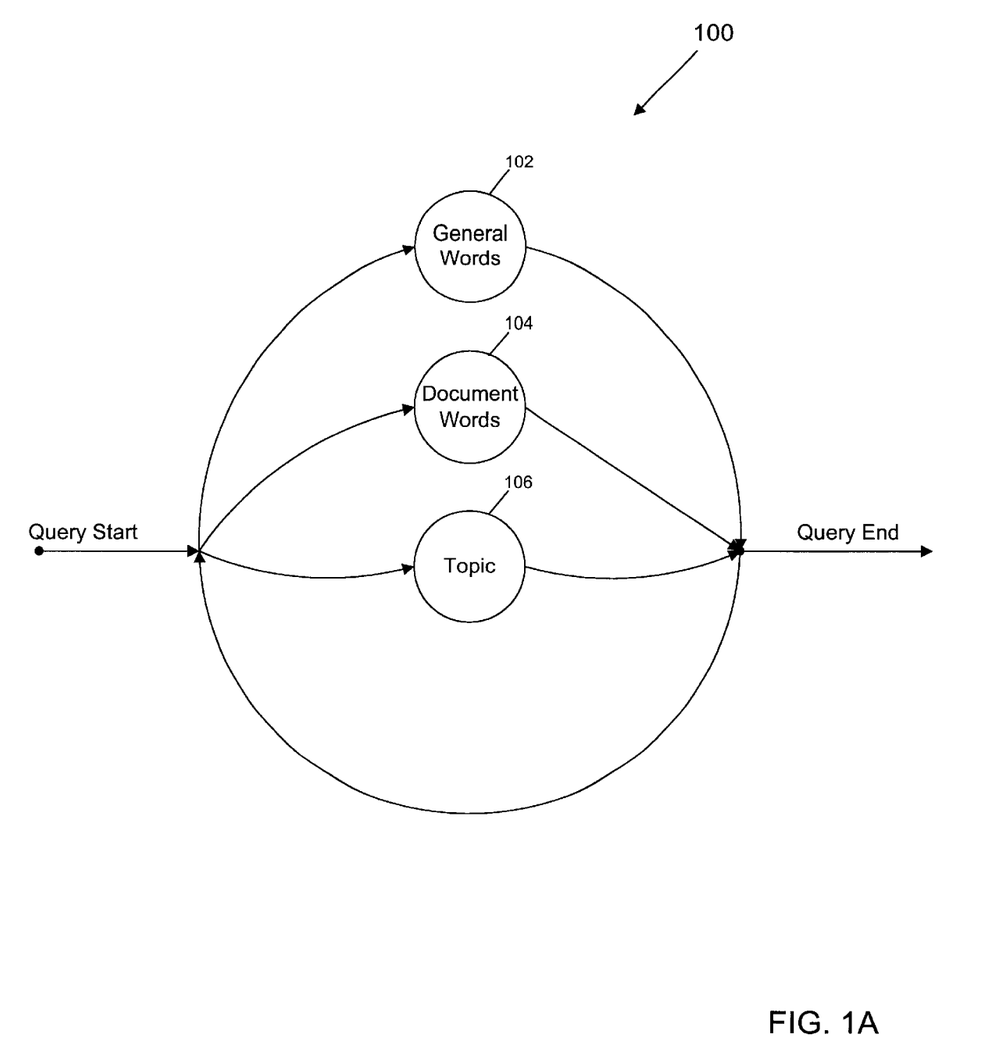
FIG. 1A depicts a hidden Markov model reflecting the process of creating a query.

To improve the accuracy of the improved IR system, methods and systems consistent with the present invention model the IR process using a hidden Markov model. A hidden Markov model is a construct used to model various processes, such as speech recognition. It comprises a number of states, each with an associated probability distribution. A process is modeled by a hidden Markov model by transitioning through the states based on various observations. FIG. 1A depicts a hidden Markov model 100 used by the improved IR system to model the process the user used when generating a, query. According to the model, the user starts the process of query generation by selecting a word from one of three sources, represented as states 102–106, and looping back to select another word from the sources. This process continues until the query is complete.

In accordance with methods and systems consistent with the present invention, the user may have used a word for one of three purposes: first, the word may be merely a general word not directed to the document in which he is interested. For example, the word may be part of the following phrase, "I would like documents relating to." Second, the word may have been derived from one or more of the documents, or third, the word may have been selected to indicate a topic or subject in which the user is interested. Based on this understanding of query generation, the hidden Markov model has three states: 102, 104, and 106. State 102 reflects that the query word was derived from among a set of general words. State 104 reflects that the query word was selected from one or more of the documents, and state 106 reflects that the query word was selected to indicate a topic in which the user is interested.

Figure 1B:
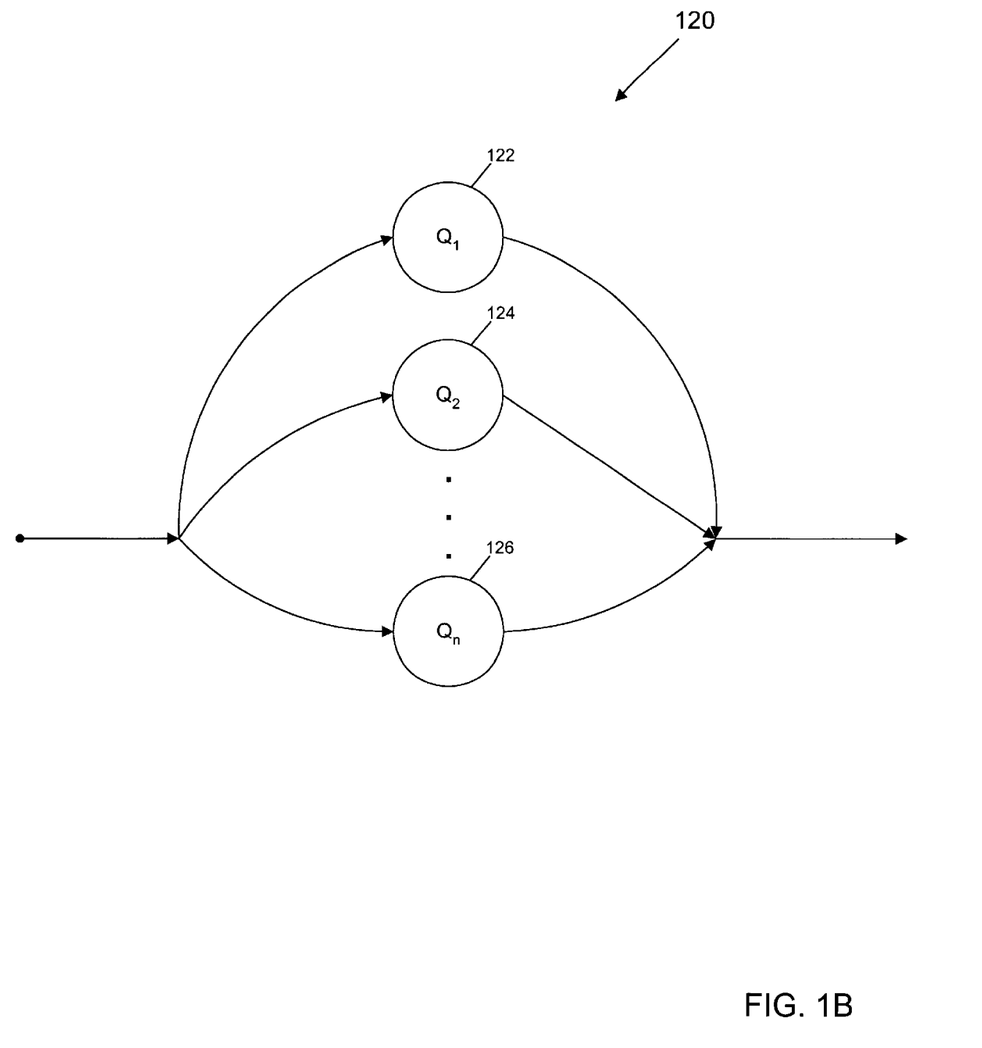
FIG. 1B depicts a more detailed diagram of the general words state in the hidden Markov model of FIG. 1A.

FIG. 1B depicts a more detailed diagram of general word state 102 of hidden Markov model 100. General word state 102 is represented as hidden Markov model 120. This model contains a number of states 122–126 representing the set of words that may be inserted into a query but which are not indicative of the kind of documents that a user would like. Each state (e.g., 122) represents one word from this set. Additionally, each state 122–126 has an associated probability of the word occurring in general language (i.e., in a random sampling of all of the words in all of the documents, how often this word appears). Although methods and systems consistent with the present invention are described relative to the English language, one skilled in the art will appreciate that they can work with other languages as well.

Figure 1C:
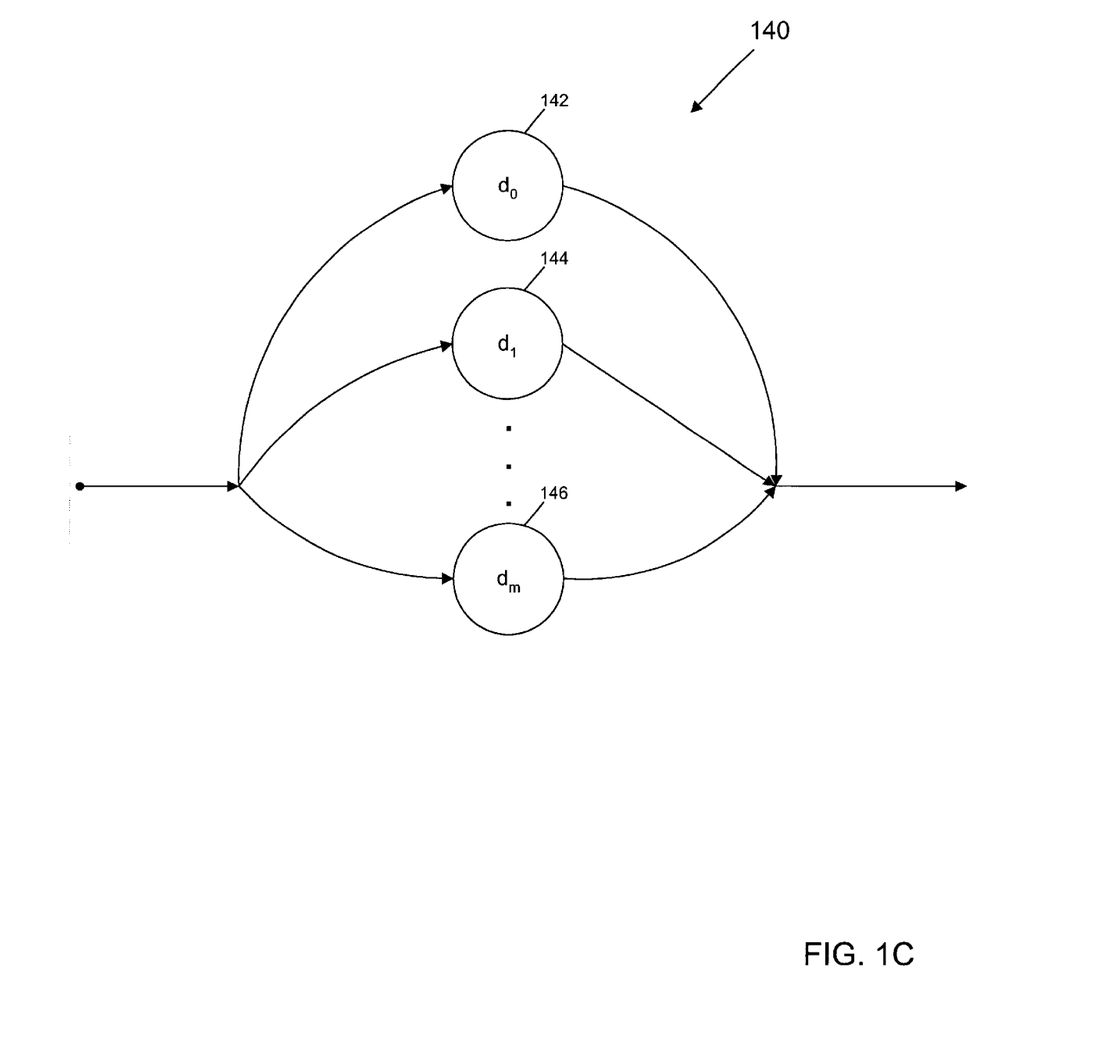
FIG. 1C depicts a more detailed diagram of the document word state depicted in the hidden Markov model of FIG. 1A.

FIG. 1C depicts a more detailed diagram of document word state 104 of hidden Markov model 100. Hidden Markov model 140 contains a number of states 142–146, where each state represents one or more words in one of the documents. That is, a state may represent an entire phrase of words, and there is one hidden Markov model 140 for each document. Each state 142–146 not only contains one or more words from the document, but also contains all of its various forms and synonyms. In addition, each state 142–146 contains a probability "$P(q_n|d_j)$" for each form and synonym of the query word or words "$q_n$" appearing in document "$d_j$", which is based on the number of times the words appear in the document.

Figure 1D:
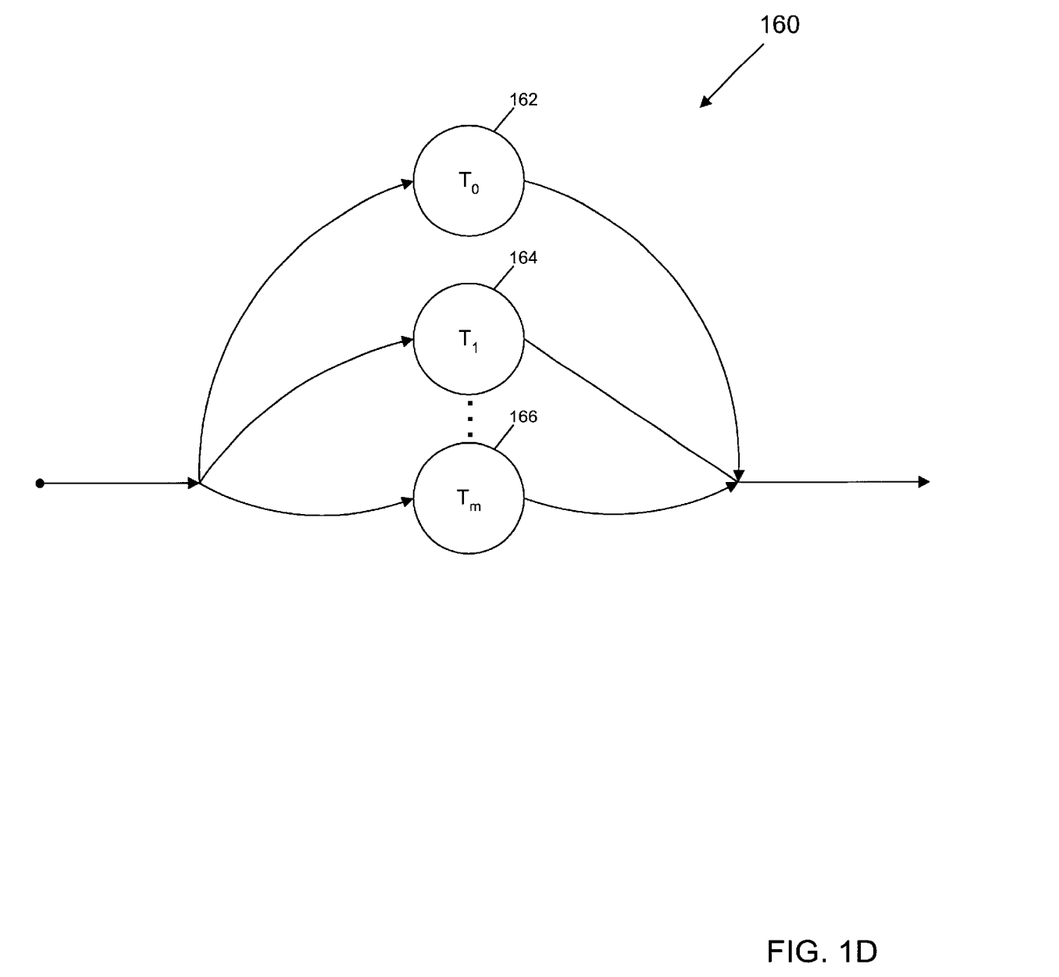
FIG. 1D depicts a more detailed diagram of the topic state of the hidden Markov model depicted in FIG. 1A.

FIG. 1D depicts a more detailed diagram of topic state 106 in hidden Markov model 100 of FIG. 1A. Topic state 106 contains a hidden Markov model 160 for each document. Hidden Markov model 160 contains a number of states 162–166 reflecting the topics that a particular document discusses. Each state contains a probability for the particular query word being used to indicate that particular topic.

Based on this theoretical model, methods and systems consistent with the present invention utilize various probablistic formulae derived from this model as is further discussed below. In performing its processing, methods and systems consistent with the present invention perform various off-line processing by a system trainer and perform various run-time processing by a query engine. As part of the off-line processing, the system trainer performs topic identification and classification by generating a list of topics reflected by the documents and by generating a list of documents that are directed to each topic. The system trainer also performs system training by creating various statistics used during run-time processing. The query engine performs run-time processing by receiving a query and by using the derived probablistic formulae to rank the documents based on the likelihood that they are relevant to the query.

Another aspect of the improved IR system is that it performs relevance feedback to further improve performance. Relevance feedback allows for the improved IR system to identify documents that may be relevant to a query by using words received from some of the documents, not the user. In performing relevance feedback, the improved IR system uses the query received from the user to generate a ranked list of relevant documents and then creates additional queries by supplementing the original query with words found in common among a number of the relevant documents returned by the original query. In this manner, documents can be retrieved and determined to be likely relevant to the original query even though they did not contain some or all of the user's query words. Relevance feedback is described in further detail below.

Although methods and systems consistent with the present invention are described below relative to retrieving documents that are considered relevant to a query, one skilled in the art will recognize that such techniques can be used to retrieve any items of information from among a larger body of items. Such items of information include web sites, articles, and other information sources.

Implementation Details

Figure 2:
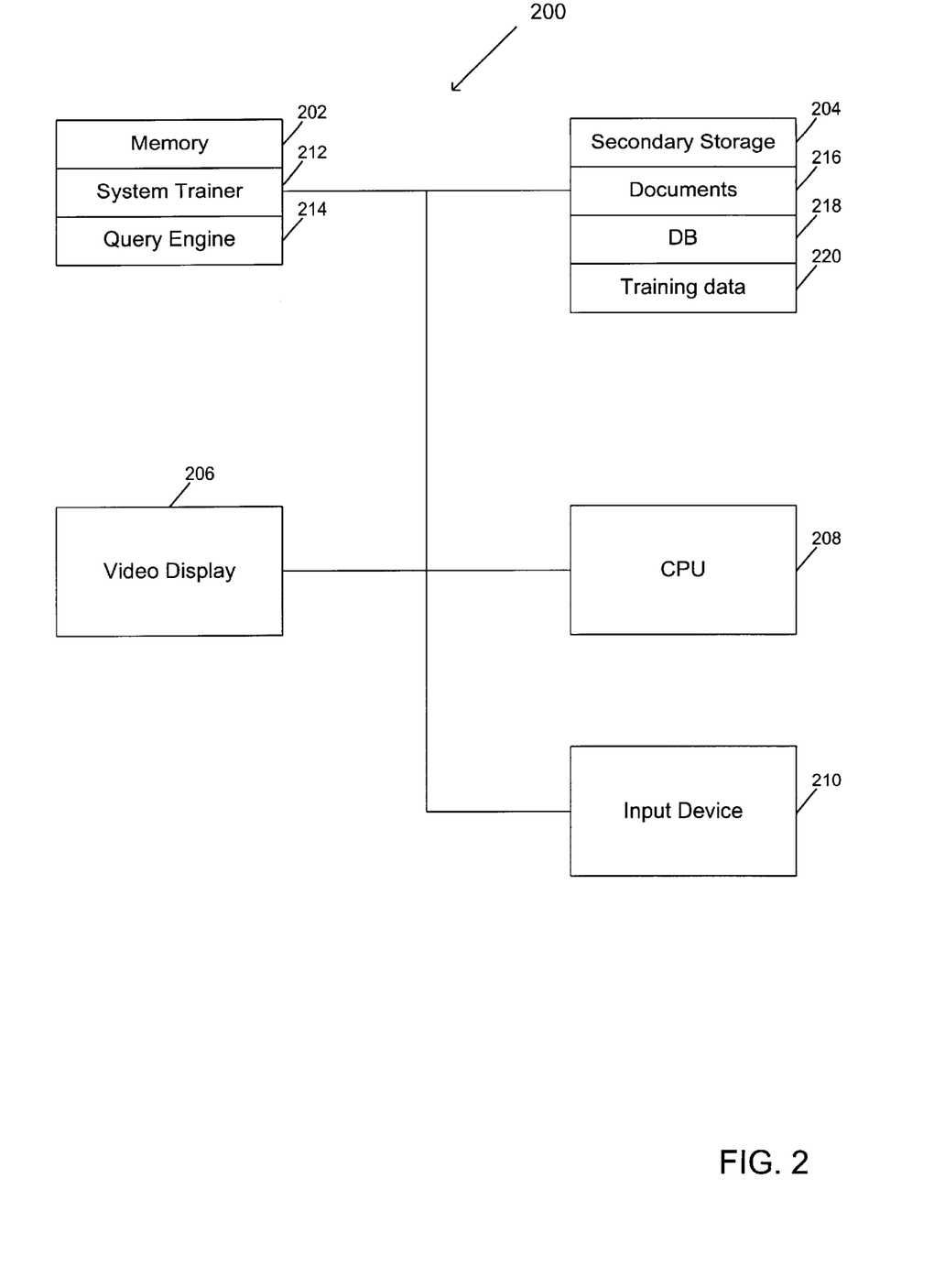
FIG. 2 depicts a data processing system suitable for practicing methods and systems consistent with the present invention.

FIG. 2 depicts a data processing system 200 suitable for use with methods and systems consistent with the present invention. Data processing system 200 contains a memory 202, a secondary storage device 204, a video display 206, a central processing unit (CPU) 208, and an input device 210. Memory 202 contains the system trainer 212 and the query engine 214. Secondary statistics used at runtime, and training data 220 containing mappings of queries onto some of the documents 216 that have been determined to be relevant to the queries. For example, one mapping may contains the query "President Clinton" and the documents "doc1," "doc5," and "doc12" because these documents discuss President Clinton. This training data is manually created by a user generating queries and then determining which of the documents are relevant to each query.

Although data processing system 200 has been described with reference to various components, one skilled in the art will appreciate that the data processing system may contain additional or different components. Additionally, although various aspects of the present invention are described as being stored in memory, one skilled in the art will appreciate that these aspects may be stored on or read from other computer-readable media, such as hard disks, floppy disks, a carrier wave from a network, or other forms of RAM or ROM. Furthermore, one skilled in the art will appreciate that documents 216 may be located on a remote system.

Figure 3A:
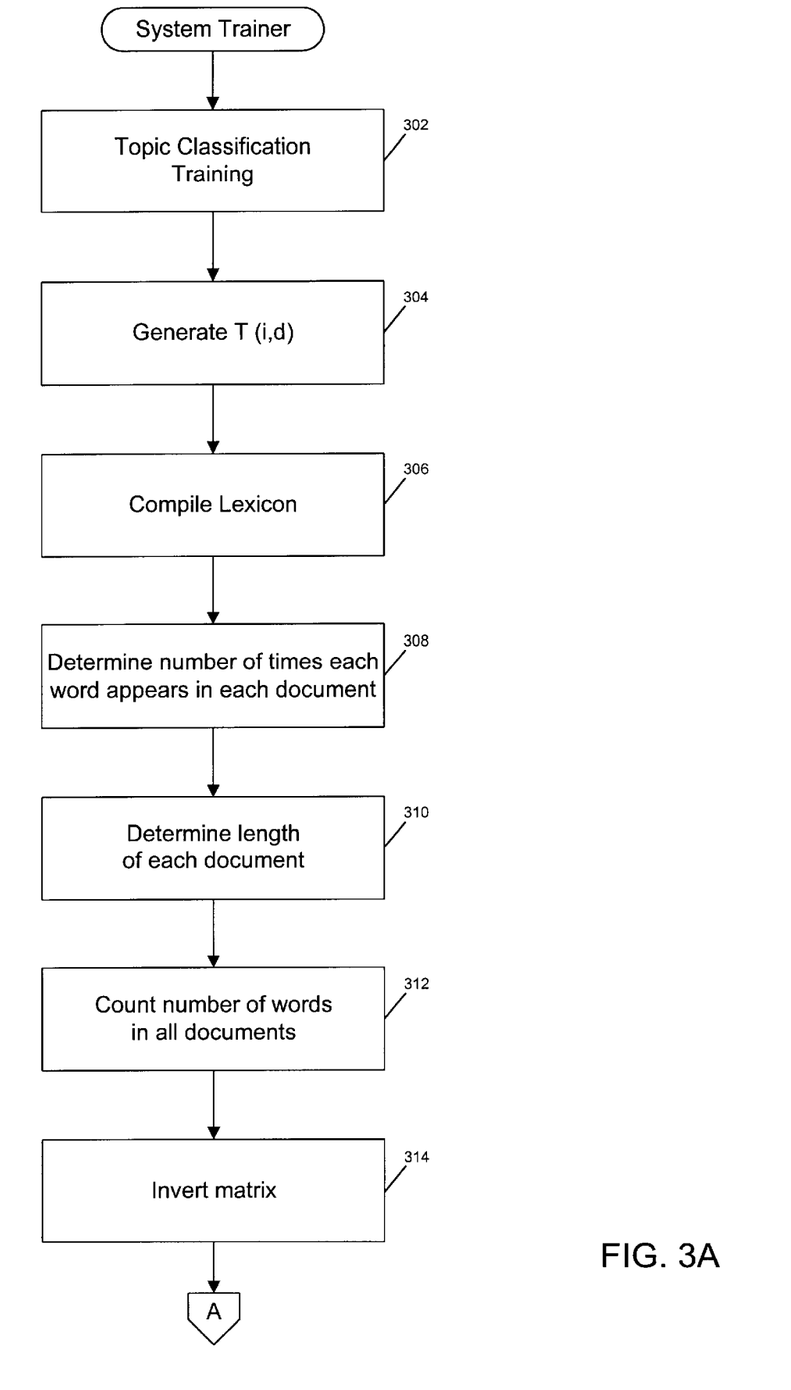
FIGS. 3A and 3B depict a flow chart of the steps performed by the system trainer depicted in FIG. 2.
Figure 3B:
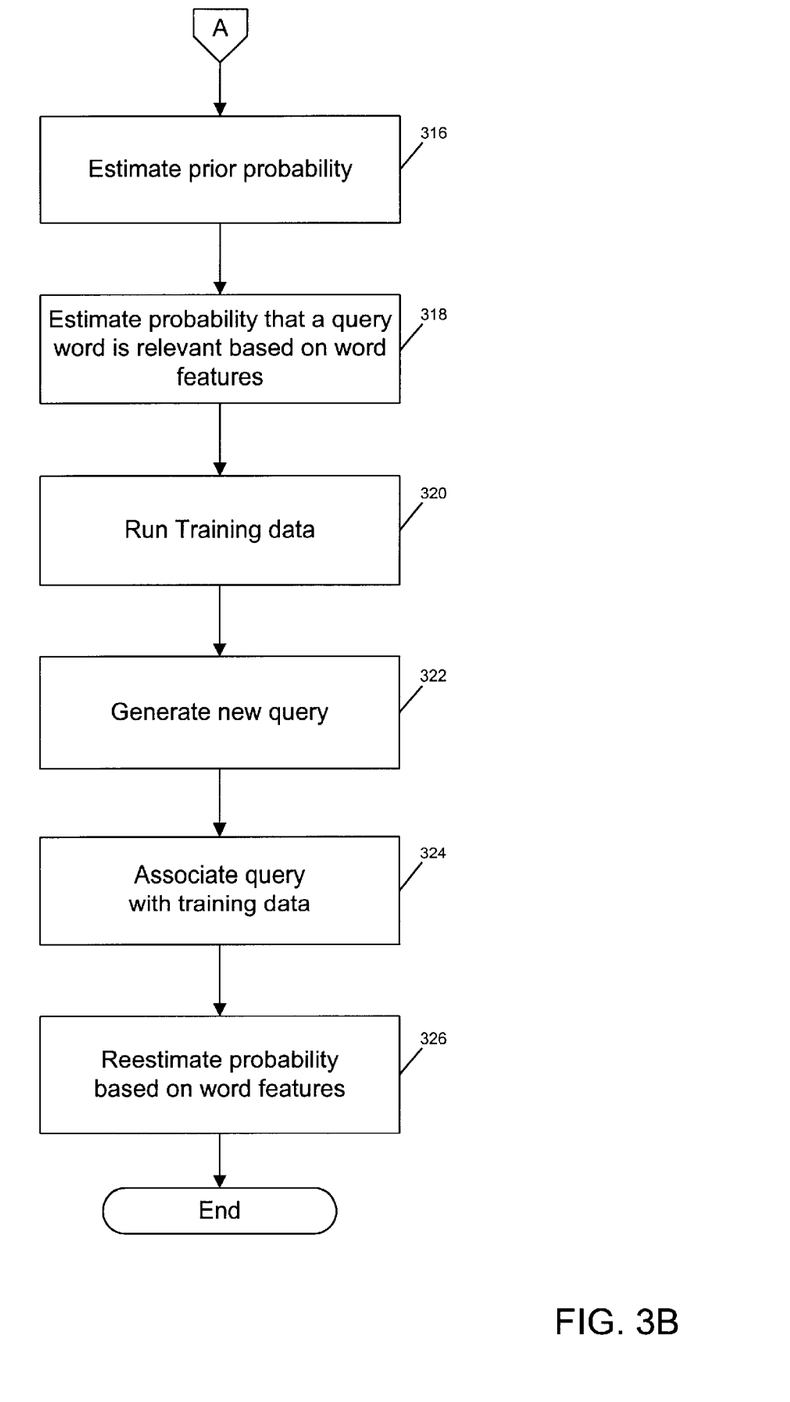

FIGS. 3A and 3B depict a flow chart of the steps performed by the system trainer in accordance with methods and systems consistent with the present invention. The system trainer first performs topic classification training (step 302). In this step, the system trainer performs topic classification in which each document is associated with a list of topics that are believed to be discussed in the document and a probability P(t|d) indicating the likelihood that the document discusses a topic. Additionally, the system trainer examines documents 216, identifies all topics that the documents discuss, and generates "P(q|$t_i$)" for each topic, which is the probability of particular words being, related to a particular topic. The result of this step is a matrix T(d,i) containing a list of all documents, the topics which they discuss, and a probability that the document discusses this topic, which are stored in the database. An example of the matrix follows:

| doc1 | Smoking | 0.98 | Civil Rights | 0.54 | Lung Cancer | 0.34 |
| doc2 | Fidel Castro | 0.72 | Cuba | | 0.98 | Florida | 0.57 |

Any method for performing topic identification and classification could be performed in this step, such as that described in co-pending U.S. patent application Ser. No. 09/005,960 now U.S. Pat. No. 6,185,531, entitled "Topic Indexing Method," filed on Jan. 9, 1998, which is incorporated herein by reference.

After performing topic identification and classification, the system trainer generates a matrix "T(i,d)" by inverting the matrix created in the previous step and stores the matrix into the database (step 304). For example, a portion the matrix T(i,d) may appear as follows:

| Smoking | doc1 | 0.98 | doc14 | 0.54 | doc101 | 0.78 |
| Fidel Castro | doc2 | 0.72 | doc22 | 0.13 | doc78 | 0.91 |

Next, the system trainer compiles the lexicon (step 306). In this step, the system trainer examines the words in all of the documents, generates a list of all words in all the documents, ("the lexicon"), removes stop words, and stems each word to determine its root using well-known techniques. In removing the stop words, the system trainer removes all words not used to indicate a document, such as articles like "an" and "the." Alternatively, each stop word can be replaced with a token. When stemming the words, the system trainer identifies the root of the word. For example, the word "work" is the root for "work," "working," and "worked." After compiling the lexicon, the system trainer determines the number of times each word appears in each document (step 308). In this step, the system trainer creates a matrix "C(d,w)," which is a count of the number of occurrences of each of the stemmed words in each document, and stores the matrix in the database. For example, a portion of the entries may be as follows:

| doc1 | Clinton | 2 | Gore | 4 |
| doc2 | President | 6 | Veto | 2 |

The system trainer then determines the length of each document "L(D)" (step 310) and counts the number of words in all documents (step 312). Next, the system trainer inverts the matrix C(d,w) to yield C(w,d) (step 314). For example, the entries in this matrix may be as follows:

| Clinton | doc1 | 2 | doc7 | 5 |
| Gore | doc1 | 4 | doc68 | 2 |
| President | doc2 | 6 | doc99 | 1 |
| Veto | doc2 | 2 | doc36 | 5 |

After inverting the matrix, the system trainer estimates the prior probability that a document is relevant as a function of various of the features of the document (step 316 in FIG. 3B). This prior probability is indicated as "P(d is Rel| features (d))." In this step, the system trainer estimates the prior probability of the likelihood that the document is relevant over all queries by using attributes like the length and subject of the document. This processing is performed using the training data, which includes manually and empirically derived entries containing queries and the documents, considered relevant to those queries. In this step, the system trainer divides all documents into groups of documents based on source. For example, one group may include articles from the Wall Street Journal and another group may include articles from the New York Times. After dividing all of the documents by source, the system trainer divides all of the documents by length. For example, one group may have <100 words and another group may have >100 words. Then, for each group, the system trainer determines the average number of times any of the documents within that group was returned as part of a query in the training data. This number is then divided by the total number of documents in the group, and the resulting probability is then assigned as the prior probability to each document in the group. The resulting probabilities can then be multiplied to obtain probabilities for various combinations of features (e.g., articles from the New York Times with less than 100 words). Although only source and length have been described, one skilled in the art will appreciate that this technique can be used for other features of the document, including the age of the document and the average length of the words in the document.

Next, the system trainer estimates the probability that a query word is relevant based on various word features (step 318). The various word features that are used include the function of the word (e.g., noun, verb, etc.) or whether the word is capitalized. Identifying the function of the word and identifying whether it is capitalized are performed using well known techniques. In performing this step, the system trainer determines the features to be considered, such as form and capitalization, and then allocates storage ("a bin") for each combination. Thus, a bin is created for nouns that are capitalized, nouns that are uncapitalized, verbs that are capitalized, etc. Then, the system trainer examines all of the training data one query at a time. For each query word in a query, the system trainer determines with which bin the query word should be associated, determines in which of the relevant documents (i.e., the documents returned as part of the query) it is contained, and stores a fraction in the appropriate bin, where the numerator of the fraction reflects the number of relevant documents in which the word was found and the denominator reflects the total number of relevant documents. After each query word in each query is processed in this manner, the numerators of all fractions in a bin are added together, the denominators for all fractions in the bin are added together, and the fraction is divided out to yield a resulting probability, P(q is in d|d is rel, features (q)), that is assigned to each word in the bin.

In addition to form and capitalization, other features of the word can also be used to influence this probability. For example, the fraction of all documents that contain this word ("document frequency") can be used. Additionally, the location of where the word is located in the document can be used. In this situation, when counting the number of relevant documents, if the word were located in the title or abstract of a document, the count can be increased by multiplying the count by a predetermined number (e.g., 5) indicating that it is more likely that this document is relevant to this word.

After estimating the probability that a query word is relevant based on word features, the system trainer performs various processing to perform relevance feedback as reflected by steps 320–326. In performing relevance feedback, the system trainer runs the queries contained in the training data (step 320). In this step, the system trainer actually invokes the query engine to generate rankings for each of the queries in the training data, as is further described below. For example, if the training data had a query "President Clinton," this query would be performed on the query engine.

Next, the system trainer generates a new query (step 322). In this step, the query engine has returned a predetermined number (e.g., 5) of the most relevant documents for each query found in the training data. The system trainer generates the new query by including the original query as received from the training data (e.g., "President Clinton") and all of the words found in common among a predetermined number of documents. For example, the system trainer may generate a new query containing the original query plus all of the words found in common among three of the five documents, four of the five documents, and five of the five documents.

After generating the new query, the system trainer associates the new query with the documents associated with the original query (step 324). That is, the system trainer creates entries in the training data that include the new query and the documents associated with the original query. Next, the system trainer re-estimates the probability that a word is relevant based on word features (step 326). In this step, the system trainer performs the same processing as that described above relative to step 318 except that additional bins are created to include the frequency of the word (e.g., it was found in three of the five documents, four of the five documents, or five of the five documents). After re-estimating the probability, processing ends. In summary, the improved IR system estimates how much more likely a particular query word is to appear in a document given that the document is relevant to the query and given features of the query word, such as the form of the word, whether the word was in the original user query, how many of the original retrieved documents (e.g., 3 out of 5) in which this word occurs, and the fraction of the documents out of all of the documents that contain this word. This expression:

p(query word is in the doc|d is R, features [q])–df[q]

where df[q] is the document frequency of the query word, is used as the transition probability to the state 104 for the document words.

Figure 4:
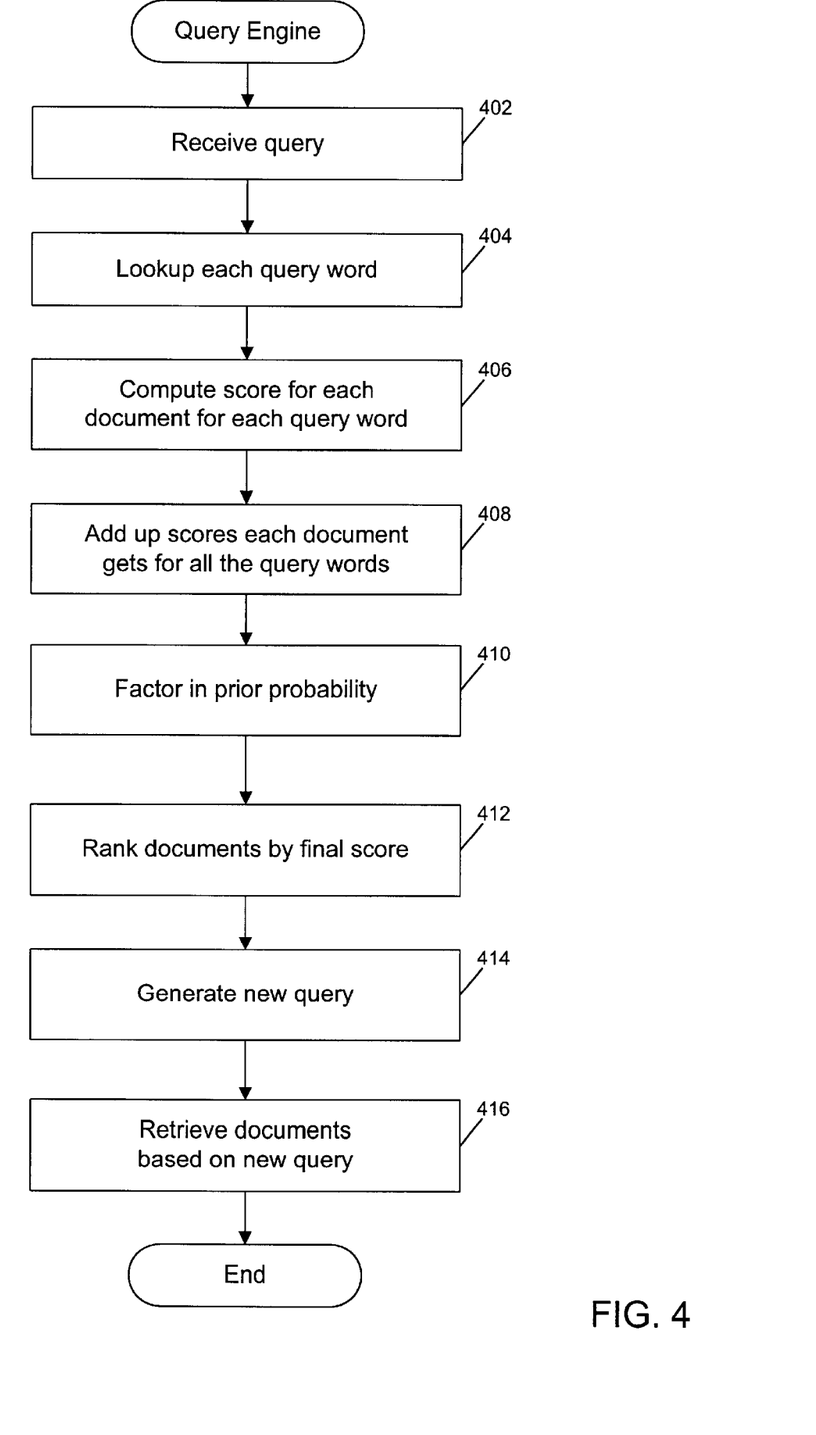
FIG. 4 depicts a flow chart of the steps performed by the query engine depicted in FIG. 2.

FIG. 4 depicts a flowchart of the steps performed by the query engine in accordance with methods and systems consistent with the present invention. The first step performed by the query engine is to receive a query (step 402). The query contains any number of words. After receiving a query, the query engine looks up each query word in the C(w,d) matrix (step 404). In this step, the query engine receives an indication of each document and the number of occurrences of that word in each document. For example, if the word "Clinton" were used as part of a query, the information returned may indicate that "doc1" contained two occurrences. After looking up each query word, the query engine computes a score for each document for each query word (step 406). In this step, the query engine utilizes the following formula:

$$qscore(q,d) = Log(a*C(q,d)/L(d) + b*\Sigma p(q|T_i)*p(T_i|d) + (1-a-b)*C(q)/N)$$

Where "a"=P(q is in d| d is rel, features (q)). It should be noted that the probabilities related to relevance feedback are not used at this time. They are used during a second pass, as discussed below. Where "b" is the weight for the topic state, which can be estimated in a manner similar to "a," as the probability that a query word that is not found in a relevant document will be found in the topic state for that document. Thus, the term "$b*\Sigma p(q|T_i)*p(T_i|d)$" reflects the likelihood that a word wouldn't appear in a document, but it is still relevant to one or more topics discussed in the relevant document. And where the term "$(1-a-b)*C(q)/N$" reflects the probability that query word "q" is in any of the documents.

Next, the query engine adds up the scores for each query word to obtain an overall score, score(d) (step 408). After adding up the scores, the query engine factors in the prior probability that the document is relevant given the features of the document (step 410). This step is performed by utilizing the following formula:

$$\text{Final Score } (d) = score(d) + Log(P(d \text{ is } rel| \text{ features}(d)))$$

After factoring in the prior probability, the query engine ranks each of the documents by the final score (step 412). In this step, the query engine may only display to the user a predetermined number of documents having the highest scores.

Although a ranking has been generated, the query engine performs a second pass, as described below in steps 414 and 416, to perform relevance feedback and to identify documents that may be relevant to the query by using additional words found in the top scoring documents. When performing relevance feedback, the query engine generates a new query based upon words found in the documents returned in step 412 (step 414). For example, in an embodiment where the top five documents are returned, the query engine generates a new query based upon words found in common among a number of the documents. In this example, the query engine may generate a new query comprising the original query plus all words found in common among three of the five documents, four of the five documents, and five of the five documents. Alternatively, the user may supervise the relevance feedback by selecting the most relevant ones of the returned documents (e.g., 5 out of 10) and then by fashioning a new query out of these five documents. After creating the new query, the query engine retrieves documents based on the new query (step 416). In this step, the query engine repeats steps 404 through 412 using the new query and generates a new ranked list of documents. In ranking the documents, the query engine utilizes the probabilities related to relevance feedback in step 406.

Although the present invention has been described with reference to an exemplary embodiment thereof, those skilled in the art will know of various changes in form and detail which may be made without departing from the spirit and scope of the claimed invention as defined in the appended claims and their full scope of equivalents.

What is claimed is:

1. A method in a data processing system having information items, comprising:

receiving a query containing a query word from a user;

computing an initial relevancy score for each information item given the query word;

determining a posterior relevancy probability for each information item, basing the determination on a prior probability that at least one of the information items are relevant independent of the query word;

computing a final relevancy score for each information item based on the initial relevancy score and the posterior relevancy probability;

ranking the information items by the final relevancy score;

selecting a number of ranked information items to be used in generating a new query;

identifying words found in common among the selected number of ranked information items;

generating the new query, wherein the new query includes the query word and the words found in common among the selected number of ranked information items;

retrieving a number of information items found to be relevant based on the new query; and presenting the list of relevant information items to the user.

2. The method of claim 1, wherein the step of selecting a number of ranked information items to be used in generating the new query is performed by a query engine.

3. The method of claim 1, wherein the step of selecting a number of ranked information items to be used in generating the new query is performed by the user.

4. A data processing system comprising:

a first storage device storing a plurality of documents;

a second storage device including a query engine, the query engine configured to:

receive a query with query words from a user indicating a relevant one of the documents, compute an initial relevancy score for each document given the query word, determine a posterior relevancy probability for each document, basing the determination on a prior probability that at least one of the documents are relevant, independent of the query word, compute a final relevancy score for each document based on the initial relevancy score and the posterior relevancy probability, rank the documents by their final relevancy score, selecting a number of ranked documents to be used in generating a new query;

identifying words found in common among the selected number of ranked documents;

generating the new query, wherein the new query includes the query word and the words found in common among the selected number of ranked documents;

retrieve a number of documents found to be relevant based on the new query; and a processor configured to run the query engine.

5. The method of claim 4, wherein the query engine is configured to generate a new query by:

receiving from the user, a selected number of ranked documents to be used in generating the new query;

identifying words found in common among the selected number of ranked documents; and generating the new query, wherein the new query includes the query word and the words found in common among the selected number of ranked documents.

6. A method in a data processing system having information items, comprising the steps of:

receiving a query containing a query word from a user;

computing an initial relevancy score for each information item given the query word;

determining a posterior relevancy probability for each information item, basing the determination on a prior probability that at least one of the information items are relevant, independent of the query word;

computing a final relevancy score for each information item based on the initial relevancy score and the posterior relevancy probability;

ranking the information items by their final relevancy score probability;

selecting a number of ranked information items to be used in generating the new query;

identifying words found in common among the selected number of ranked information items;

generating a new query, wherein the new query includes the query word and the words found in common among the selected number of ranked information items;

retrieving a number of information items found to be relevant based on the new query; and presenting the list of relevant information items to the user.

7. A data processing system comprising:

a first storage device storing a plurality of documents;

a second storage device including a query engine, the query engine configured to:

receive a query with query words from a user indicating a relevant one of the documents, compute an initial relevancy score for each document given the query word, determine a posterior relevancy probability for each document, basing the determination on a prior probability that at least one of the documents are relevant, independent of the query word, compute a final relevancy score for each document based on the initial relevancy score and the posterior relevancy probability, rank the documents by their final relevancy score, select a number of ranked documents to be used to generate a new query, identify words found in common among the selected number of ranked documents, generate the new query, wherein the new query includes the query word and the words found in common among the selected number of ranked document, and retrieve a number of documents found to be relevant based on the new query; and a processor configured to run the query engine.

\* \* \* \* \*